United States Patent Office 3,551,401
Patented Dec. 29, 1970

3,551,401
EASILY DYEABLE POLYOLEFIN COMPOSITION
Yoshisato Fujisaki and Itsuho Aishima, Tokyo, Noboru Fukuma, Nobeoka-shi, Atsuo Nakanishi, Yokohama-shi, and Kenichi Matsui, Tsukasa Shima, and Chiyouzi Nakai, Nobeoka-shi, Japan, assignors to Asahi Kasei Kogyo Kabushiki Kaisha, Osaka, Japan, a corporation of Japan
No Drawing. Filed June 29, 1967, Ser. No. 649,864
Claims priority, application Japan, Dec. 29, 1966, 41/85,636
Int. Cl. C08f 29/04, 29/02, 37/00
U.S. Cl. 260—93.7                14 Claims

ABSTRACT OF THE DISCLOSURE

An easily dyeable polyolefin composition comprising (a) a polyolefin; (b) a compound having a basic nitrogen atom; and (c) an inorganic compound. Both (b) and (c) are of a particle size less than 1 micron and are present in amounts of 0.5–20wt. percent provided however that (c) is present in an amount of more than ⅓ the amount of (b).

---

It is an object of the present invention to provide a polyolefin composition which is excellent in dyeability.

Notwithstanding that conventionally polyolefins, for example, such as stereo-regular polypropylene, polybutene or high density polyethylene have a number of advantages from the viewpoint of physical property, it is very difficult to dye articles thereby with deep color as well as with fastness because of their molecular structure in which no polar group is contained. This has heretofore been a great hinderance in utilizing their usefulness.

It is well known that there have been many studies attempted on improvements in dyeability of such hardly dyeable polyolefins as mentioned above.

Some of these studies have already been made public in the form of patent or others. For example, there may be mentioned a method which relies on introduction of a polar group into the molecule by subjecting polyolefin shaped articles to chemical treatment. Which relies on incorporating a high molecular weight substance having a polar group into a polyolefin before shaping the polyolefin in order to dye the shaped polyolefin mainly with disperse dyes, which relies on introduction of a basic nitrogen compound into a polyolefin before shaping the polyolefin in order to dye the shaped polyolefin mainly with acid dyes, and which relies on incorporating a metal compound into a polyolefin before shaping the polyolefin in order to dye the shaped polyolefin with a special mordant dye by utilizing a polyvalent metal of said metal compound as a dyeing seat of said mordant dye. These methods, however, suffer from such many drawbacks from the industrial point of view that it is difficult to obtain a uniform composition, that forms of the shaped polyolefin compositions are subject to limitation, that a special mixing method is required for preparing polyolefin material, that a special dyeing method is required for dyeing the shaped polyolefin, that sufficient dyeing cannot be effected without subjecting the shaped polyolefin to special chemical treatment before dyeing, and further from that additives contained in the polyolefin composition bled out therefrom during heating or dyeing step.

Furthermore, there are many cases which involve that even if a satisfactorily dyed product can be obtained with a certain kind of dyestuff, the satisfactorily dyed product cannot be obtained similarly when dyed with a dyestuff having different color hue from the former, or in some cases, since the shaped polyolefin can be dyed only with a dyestuff having a special chemical structure, the dyeing method thereof and color hue of the dyed product must be subject to restrictions.

In addition, in case the additives are incorporated into the polyolefin composition before shaping, it is required that these additives must withstand ordinary molding temperature and be colorless, and further that various kinds of dyestuffs in large amounts must be dyed on to the polyolefin shaped articles by addition of these additives in relatively small amounts. For these reasons, the kind of those additives employed is particularly limited. Still further, even if such additives satisfy these requirements, their dye adsorption ability is greatly reduced when they are contained in the polyolefin resin. For instance, notwithstanding that an additive itself alone absorbs a very large amount of acid dyestuff, the shaped product obtained by melting and incorporating the additive in the polyolefin resin may be dyed with disperse dyes even to some extent, but it can hardly be dyed with the important acid dyes. Even when dispersion property of said additive is improved by using at the same time a multivalent metal salt of higher fatty acid such as aluminum sterate or cadmium sterate, merely the dyeability of the shaped polyolefin composition is improved to a certain extent for disperse dyes, but no substantial effectiveness thereof can be seen for acid dyes in some cases. Accordingly, there are still remained such inconveniences that inevitably the additive must be used in an excess amount or the shaped article must be subjected to a special chemical treamen after shaping step. Further, the additive must be a substance rich in polarity from necessity of absorbing a large amount of dyestuff as mentioned above, and consequently the incorporation of a large amount of said additive in polyolefin resin which is perfectly of nonpolarity results in a difficulty from shaping operation. Still more, this may tend to have an adverse influence upon the inherentially excellent mechanical properties of polyolefins.

Extensive investigations for many years by the present inventors for overcoming such various difficulties as mentioned above have resulted in the present invention, wherein a polyolefin composition which can readily be dyed with anionic dyestuffs with deep color as well as with fastness could be provided by reducing an amount of polar substance to be added thereto, which has an active point of dye absorption. That is, the present invention relates to a polyolefin composition excellent in dyeability which is characterized by the fact that the material (A) consisting of a kind of compounds (but aminotriazol and related substances being excluded) which contain a basic nitrogen atom in their molecules or a kind of two or more kinds of them, and the inorganic compound (B) consisting of a kind of members selected from the group consisting of lithium carbonate, strontium carbonate, calcium carbonate, potassium carbonate, magnesium carbonate, basic magnesium carbonate, zinc carbonate, magnesium hydroxide, zinc hydroxide, calcium silicate, magnesium oxide and zinc oxide, each having an average particle size of less than 1 micron, or a mixture of two or more kinds of them, are mixed with a polyolefin in amounts of 0.5–20% by weight, respectively based on the weight of the polyolefin composition in such a manner that (B) is contained therein in an amount of more than ⅓ times the amount of (A).

The compounds having a basic nitrogen atom in their molecules which can be used in the present invention includes all the substances except aminotriazol and related substances, for instance, there may be mentioned the following.

(1) Amines represented by the general formula

wherein $R^1$ is an alkyl or cycloalkyl group having 8 or more of carbon atoms, and $R^2$ and $R^3$ are respectively hydrogen atom, alkyl group, aryl group, aralkyl group or derivatives thereof. Concrete examples thereof include such as octadecylamine, dihexadecylamine, dihexadecyl methylamine, dioctadecyl methylolamine, octylbenzylamine and N-octadecylaniline. Particularly, such tertiary amines, in which $R^1$, $R^2$ and $R^3$ are respectively alkyl or cycloalkyl group having 8 or more carbon atoms, or derivatives thereof, afford good result. As typical example of such compounds, there may be mentioned trioctylamine, tridodecylamine and the like. Furthermore, $R^2$ and $R^3$ may form a closed ring or its derivative. Example of such compounds includes N-octylpiperidine, N-undecylpiperidine and the like.

(2) Pyridine derivatives.—As example of pyridine derivatives, there may be mentioned 2-methyl 5-ethylpyridine and Symtri (4-pyridyl) cyclohexan which is a trimer of vinylpyridine.

(3) Ammonium salt represented by the general formula

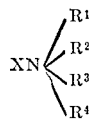

wherein $R^1$ is an alkyl or cycloalkyl group consisting of 8 or more carbon atoms, $R^2$, $R^3$ and $R^4$ are respectively hydrogen atom, alkyl, aryl or aralkyl group or derivative thereof, and X is chlorine, bromine, carboxylic acid, sulfonic acid or anion of anion surface active agent.

Examples of these compounds include octadecyl ammonium acetate, didodecyl ammonium chloride, dioctyl ammonium octadecylate, octyldimethyl ammonium bromide, and trioctyl ammonium dodecylbenzensulfonate.

(4) High molecular weight substances having in their molecule more than $1 \times 10^{-5}$ gram equivalent per gram of a nitrogen atom capable of being formed in the form of ammonium ion in the acid aqueous solution of pH 2. For instance, the following polymers may be exemplified. Polymers of vinyl monomer having a basic nitrogen typified by vinylpyridine. N-vinylcarbazol, N,N-diethylamino ethylmethacrylate, etc., and copolymers having at least one of these vinyl monomers as a constituent and denaturants thereof. Homopolyamide and copolyamide such as poly-ε-caprolactum, polyhexamethyleneazipamide and polyhexamethylenesebacamide having amino group at the terminal of polymer, or denaturants thereof. Polyalkyleneimine such as polyethyleneimine, polypropyleneimine, etc. and derivatives thereof. Reaction products of epichlorohydrin with amino and/or diamines (including piperazine and piperazine derivatives). Condensation polymers of polyamide, polyester, polyurethane, polycarbonate, etc., having in their main chain a basic nitrogen and having as constituent one or more dicarboxylic acid, glycol or diamine selected from the group consisting of dicarboxylic acid having a basic nitrogen atom such as isocinchomeronic acid, N-methyl di (carboxyethyl) amine, etc., glycol having a basic nitrogen atom such as 2,5-dimethylolpyridine, and primary or secondary diamine having one or more tertiary amine such as sym-N-methyl diethylenetriamine. Polymers into which a basic nitrogen atom is introduced by means of chemical denaturation of polymer having thiuram salt obtained by thiourea treatment of polyvinyl alcohol, polymer having dihydroimidazol obtained by ethylenediamine treatment of polymethylmethacrylate, etc. These polymers must have more than $1 \times 10^{-5}$ gram equivalent per gram of the so-called basic nitrogen atom. It is already well known from a number of proposals that polyolefin shaped article can be endowed with dyeability by melt-shaping the same in admixture with compounds having a basic nitrogen atom in their molecule. The present invention has made further improvements in these methods, thereby to produce a easily dyeable composition having very high value from the industrial point of view.

That is, when compound having a basic nitrogen atom is added and admixed with polyolefin according to conventionally proposed methods, even if said compound has high affinity to a dyestuff employed, it is a usual manner to increase the amount of said compound to be added or to chemically treat the obtained shaped article after shaping the composition in order to improve dyeing properties thereof, because dyeing properties of said compound is remarkably reduced when incorporated in polyolefin. Still more, the additives contained in the composition is bled out therefrom during heating step before dyeing or during dyeing process depending upon the kind of compound having a basic nitrogen atom, and the dyeings are found to be poor in color fastness to washing, and further, those methods are subject to frequent hinderances of various sorts.

However, in accordance with the present invention it has been found that when fine-powder inorganic compound having average grain size of less than 1 micron is added together with these compounds having a basic nitrogen atom in a specific proportion as defined in the present invention to polyolefin, such hinderances as mentioned above can be eliminated, whereby a dyed product with deep color and distinctness. It has heretofore not been known at all that a composition having remarkably improved dyeability can be obtained by a combination of a compound having a basic nitrogen atom and fine-powder inorganic compound, and the reason why the composition of the present invention drastically increases its rate of exhaustion of dyestuff, particularly anion dyestuff, has been unknown. As the result of extensive studies on the subject, the present inventors have found the effect as mentioned above, which have resulted in the present invention.

Fine powders of inorganic compound used in the present invention are those having the average particle size of less than 1 micron selected from the group consisting of lithium carbonate, strontium carbonate, calcium carbonate, barium carbonate, magnesium carbonate, basic magnesium carbonate, zinc carbonate, magnesium hydroxide, zinc hydroxide, calcium silicate, magnesium oxide and zinc oxide. Amongst these inorganic compounds, those having grain size of less than 0.2 micron particularly give good results. Furthermore, calcium carbonate and basic magnesium carbonate are excellent as compared with other compounds, which are preferably used in the composition of the present invention. These compounds are not always necessarily to be chemically pure, for instance, in the case of calcium carbonate, there may be used ordinary precipitated calcium carbonate or finely pulverized natural calcite, marble, lime stone, etc. The surface of these fine powder may be treated with, for instance, polyolefins or higher fatty acids or metal salts thereof for the purpose of prevention of coherence and other purposes. In case, light stabilizer, thermal stabilizer or fluorescent whitening agent, etc., is added to the composition, the surface of fine-powder inorganic compound may be treated previously with these additives.

In obtaining the composition of the present invention, the amounts of compound (A) having a basic nitrogen atom and fine-powder inorganic compound (B) are 0.5–20% by weight respectively based on the weight of the composition, preferably 1–5% by weight. Furthermore, it is necessary that (B) is contained in such a manner that the amount of (B) is to be more than ⅓ times the amount of (A). When the amount of (B) is less than ⅓ times the amount of (A), the effect for improving dyeability of polyolefin is significantly reduced.

The method of the present invention will be explained in detail below. (Hereinafter (A) represents a compound having a basic nitrogen atom, and (B) represents fine-powder inorganic compound as defined in the claim.)

In practicing the present invention, incorporating and admixing (A) and (B) into polyolefin can be readily accomplished by presently available ordinary means, for example, by using a kneading roller, mixer, blender or extrusion type mixer, etc., and no special means are required. (B) is readily dispersed homogeneously when kneaded in a melt of polyolefin, and in this case further promotes dispersion of (A) which coexists therewith. This effect is significantly observed in particular in case (A) is a high molecular weight polymer. When (B) is not added, not only a relatively large amount of (A) is required to be added in order to a dyed product having the same deepness of color but also dyeability of said dyed product tends to fluctuate depending upon the state of dispersion of (A). Advantageously, however, such fluctuation can be avoided by the addition and mixing of (B) thereto. There is observed a tendency that high chroma of color of the dyeings is rather improved without causing substantial deterioration thereof by the addition and mixing of (B). Furthermore, (A) and (B) may be used respectively by previously mixing with a part of polyolefin at a temperature nearby of above the melting point of polyolefin, or (B) may be mixed with (A) and then the mixture is added to a polyolefin substance.

The composition of the present invention display good dyeability to dyestuffs, particularly to commonly used anion dyestuffs. It is a prominent characteristic of the present invention that a remarkable effect can be exhibited by dyeing the shaped articles of the composition of the present invention with commonly used dyestuffs such as acid dyes (including 1:1 type and 1:2 type metallised dyes) direct dyes and acid mordant dyes. Dyeing method for dyeing the composition of the present invention is not particularly defined, the dyeing may be accomplished according to ordinary acid dyeing method, particularly use of halogenated acetic acid, benzyl halide and aromatic carboxylic acid as dyeing assistants is desirable to reduce a pH of a dye bath. Furthermore, percentage of dye exhaustion of the shaped article to be dyed is increased by treating the shaped product with an aqueous solution or dispersion in-water solution of the aforesaid dyeing assistants before the dyeing. In dyeing a polyolefin composition into which a high molecular weight polymer having a basic nitrogen atom is incorporated, it has been known that the polyolefin composition is previously pretreated with, for example, chemical agents which are reactive into additives such as formation or epichlorohydrin. When this treatment is applied to the composition of the present invention, in some cases the effect thereof is further enhanced significantly.

The compositions used in the present invention include, as polyolefin, any of polymers such as polyethylene, polypropylene, polybutene, poly-3-methylbutene-1, poly-4-methylpentene-1, etc., or copolymers having two kinds or more of olefins as a unit of constituents. The polyolefin composition may be shaped into any form such as film, sheet, fiber and so on. In cases of fibers of polypropylene and poly-4-methylpentene-1, the characteristic of the present invention is exhibited in particular.

The present invention is explained in more detail by referring to the following examples.

EXAMPLE 1

Ninety parts of powder of crystalline polypropylene (viscometric average molecular weight: about 120,000) was melt-mixed at 230° C. with 5 parts of actadecyl-amine and 7 parts of calcium silicate having average particle size of less than 0.1 micron to obtain pellets. The pellets were melt-spun at 250° C. and drawn at 3 times the original length to obtain fibers of about 7 d. monofilament. 20 g. of the fibers was dyed in 1 l. of acid solution containing 10 g. of monochloroacetic acid with 0.6 g. of C.I. Acid Orange 7, 15510, at 100° C. for 90 minutes to obtain a fresh reddish orange dyeing. The percentage of dye exhaustion was more than 90%.

On the other hand, in the case where the amount of calcium silicate added was reduced to less than 0.5%, the percentage of dye exhaustion was very poor and there was observed a large amount of tacky material of orange color being adhered onto the surface of the dyed fibers.

EXAMPLE 2

Three parts of trioctylamine and 3 parts of precipitated calcium carbonate having average particle size of less than 0.05 micron were mixed with 100 parts of pellets of crystalline polypropylene (viscometric average molecular weight: about 120,000) which was stabilized against light and heat by previously incorporating therein 0.3 part of 2-hydroxy-4-n-octoxybenzophenol, 0.25 part of dilauryl-thiodipropionate and 0.25 part of 2,2'-methylene-bis (4'-methyl-β-tert.-butylphenol). The mixture was kneaded with Banbury mixer and then cut into the form of pellet. The pellets were melt-spun at 230° C. and drawn at 3 times the original length at 120° C. to obtain fibers of about 3 d. of monofilament. 20 g. of the fibers was dyed in 1 l. of acid solution containing 4 g. of salicylic acid with 0.6 g. of C.I. Acid Orange 7, 15510, at 100° C. for 90 minutes to obtain a fresh reddish orange dyeing. The percentage of dye exhaustion was more than 90%.

On the other hand, in the case where the amount of precipitated calcium carbonate added was reduced to less than 0.5%, the percentage of dye exhaustion was less than 60%, and there was observed a large amount of tacky material of orange color being adhered onto the surface of the dyed fibers.

EXAMPLE 3

Five parts of undecylpiperidine and 5 parts of magnesium oxide having an average particle size of 0.1 micron were kneaded and admixed in 100 parts of pellets of polypropylene having viscometric average molecular weight of about 120,000 and the kneaded compound was cut into the form of pellet. The pellets were extruded at an extruding temperature of 250° C. to obtain a sheet having about 0.2 mm. thickness. The sheet was biaxially stretched to about 1.5 times the original length. The film obtained was dyed in 1 l. of solution containing 4 g. of salicyclic acid with 0.6 g. of C.I. Acid Orange 7, 15510, at 100° C. for 90 minutes to obtain a fresh reddish orange dyeing. The percentage of dye exhaustion was more than 90%. The dyed film obtained from the composition in which magnesium oxide has not been incorporated, and was found to have a large amount of tacky material of orange color being adhered onto the surface thereof.

EXAMPLE 4

In Example 3, sym-tri (4-pyridyl) cyclohexane was used in place of undecylpiperidine to obtain polypropylene fiber. The dyed product which was dyed under the same conditions as in Example 3 has been found to be deeply colored and fresh. In this example, the dyed sheet obtained from the compoistion in which the precipitated calcium carbonate was not incorporated was found to be dyed with the dyestuff only at the surface thereof, and color was unclear and pale.

EXAMPLE 5

In Example 2, zinc hydroxide and dodecyltrimethyl ammonium acetate were used in place of the precipitated calcium carbonate and trioctylamine, respectively, to obtain polypropylene fibers. 20 g. of the fibers was dyed in 1 l. of acid solution containing 6 g. of benzoic acid with 0.6 g. of C.I. Acid Red 111, 23265, at 100° C. for 90 minutes to obtain a fresh red dyeings. The percentage of dye exhaustion was more than 90%. In the case of dyed product obtained from the composition in which zinc hydroxide was not incorporated, the percentage of dye exhaustion was very low, and there was observed a large amount of tacky colored material being adhered onto the surface of the dyed fibers.

EXAMPLE 6

Ninety parts of powder of crystalline polypropylene (viscometric average molecular weight about 130,000) was melt and mixed at 230° C. with 5 parts of copolymer of styrene/2-methyl-5-vinylpyridine (50:50) and 5 parts of lithium carbonate having average particle size of less than 0.1 micron to obtain pellets. The pellets were melt-spun at 260° C. and stretched to three times the original length at 120° C. to obtain the fibers of about 6 d. of monofilament. 20 g. of the fibers was dyed in 1 l. of acid solution containing 10 g. of monochloroacetic acid with 0.6 g. of C.I. Acid Orange 7, 15510, at 100° C. for 90 minutes to obtain a fresh reddish orange dyeing. The percentage of dye exhaustion was more than 90%. On the other hand, in the case where the dyed product did not contained lithium carbonate, the percentage of dye exhaustion was very low.

EXAMPLE 7

The same procedures as in Example 6 was repeated except that condensation polymer containing in its main chain a piperazine ring obtained by reacting epichlorohydrine with piperazine and stearylamine in the presence of sodium hydroxide was used in place of styrene/2-methyl-5-vinylpyridine copolymer to obtain polypropylene fibers. 20 g. of the fibers was dyed in 1 l. of acid solution containing 10 g. of acetic acid with 0.6 g. of C.I. Acid Yellow 117, 24820, at 100° C. for 90 minutes to obtain a deep yellow dyeings. The percentage of dye exhaustion was more than 95%. On the other hand, in the case of the dyed product which did not contain lithium carbonate, the percentage of dye exhaustion was less than 85%, and there was observed a large amount of tacky material of yellow color being adhered onto the surface of the dyed fibers.

What is claimed is:

1. A polyolefin composition comprising a polyolefin and mixed therewith at least one amino compound represented by the formula

wherein $R^1$ is an alkyl or cycloalkyl group having 8 or more carbon atoms and $R^2$ and $R^3$ are respectively hydrogen, alkyl, cycloalkyl, aryl or aralkyl and the ammonium salts thereof and at least one inorganic compound selected from the group consisting of lithium carbonate, strontium carbonate, calcium carbonate, barium carbonate, magnesium carbonate, basic magnesium carbonate, zinc carbonate, magnesium hydroxide, zinc hydroxide, calcium silicate, magnesium oxide and zinc oxide, each having an average particle size of less than 1 micron, said compounds being present in amounts of 0.5–20% based on the weight of the composition with the proviso that said inorganic compound be present in an amount of more than ⅓ times the amount of the amino compound or the ammonium salt thereof.

2. A composition according to claim 1 wherein polyolefin is a crystalline polypropylene, crystalline poly-4-methylpentene-1, or straight chain polyethylene.

3. A composition according to claim 1, wherein $R^1$, $R^2$ and $R^3$ are respectively alkyl or cycloalkyl groups having 8 or more carbon atoms.

4. A composition according to claim 1 wherein the amino compound is 2-methyl-5-ethylpyridine or sym-tri (4-pyridyl) cyclohexan.

5. A composition according to claim 1, wherein the inorganic compounds have an average particle size of less than 0.2 micron.

6. A composition according to claim 5 wherein the inorganic compound is calcium carbonate having an average particle size of less than 0.2 micron and same is used in an amount of 1–5 weight percent based on the weight of the composition.

7. A composition according to claim 1 wherein the inorganic compound is calcium carbonate having a particle size of less than 0.2 micron.

8. A composition according to claim 1 wherein the amino compound is N-octylpiperidine or N-undecylpiperidine.

9. A composition according to claim 8 wherein the inorganic compound is calcium carbonate having a particle size of less than 0.2 micron.

10. A composition according to claim 4 wherein the inorganic compound is calcium carbonate having a particle size of less than 0.2 micron.

11. A composition according to claim 6 wherein the surface of the calcium carbonate is coated with a surface treatment agent.

12. A composition according to claim 6 wherein the surface of the calcium carbonate is coated with a dispersion agent.

13. A composition according to claim 6 wherein the surface of the calcium carbonate is treated with a light stabilizer, thermal stabilizer or fluoroescent whitening agent.

14. A composition according to claim 3, wherein the inorganic compound is calcium carbonate having a particle size of less than 0.2 micron.

References Cited

UNITED STATES PATENTS

| 3,305,603 | 2/1967 | McIntyre | 260—860 |
| 3,331,806 | 7/1967 | Fior et al. | 260—41 |

FOREIGN PATENTS

| 728,708 | 2/1966 | Canada | 260—94.9 |

JOSEPH L. SCHOFER, Primary Examiner

S. M. LEVIN, Assistant Examiner

U.S. Cl. X.R.

260—80.78, 88.2, 94.9, 857, 859, 873, 895, 901